May 21, 1957 — S. P. V. PIATTI — 2,792,899
MOTOR BICYCLES OR SCOOTERS
Filed Aug. 28, 1951 — 2 Sheets-Sheet 1
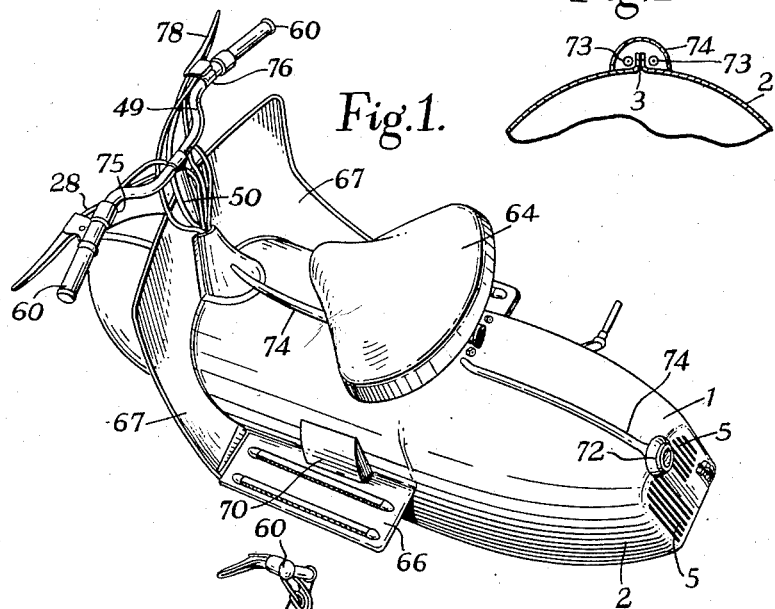
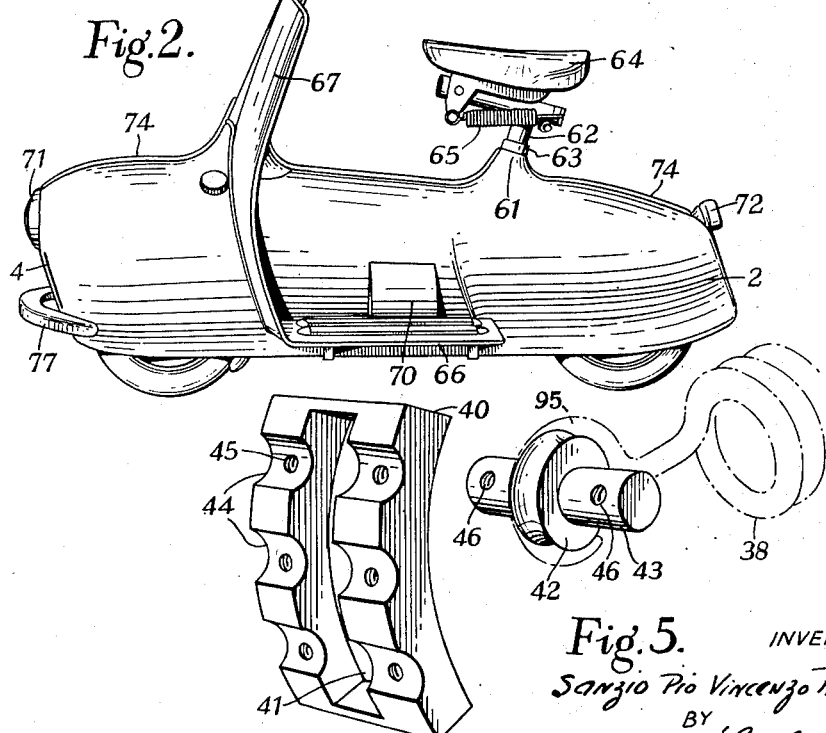
INVENTOR
Sanzio Pio Vincenzo Piatti
BY
O'Boyle & Blain
ATTORNEYS

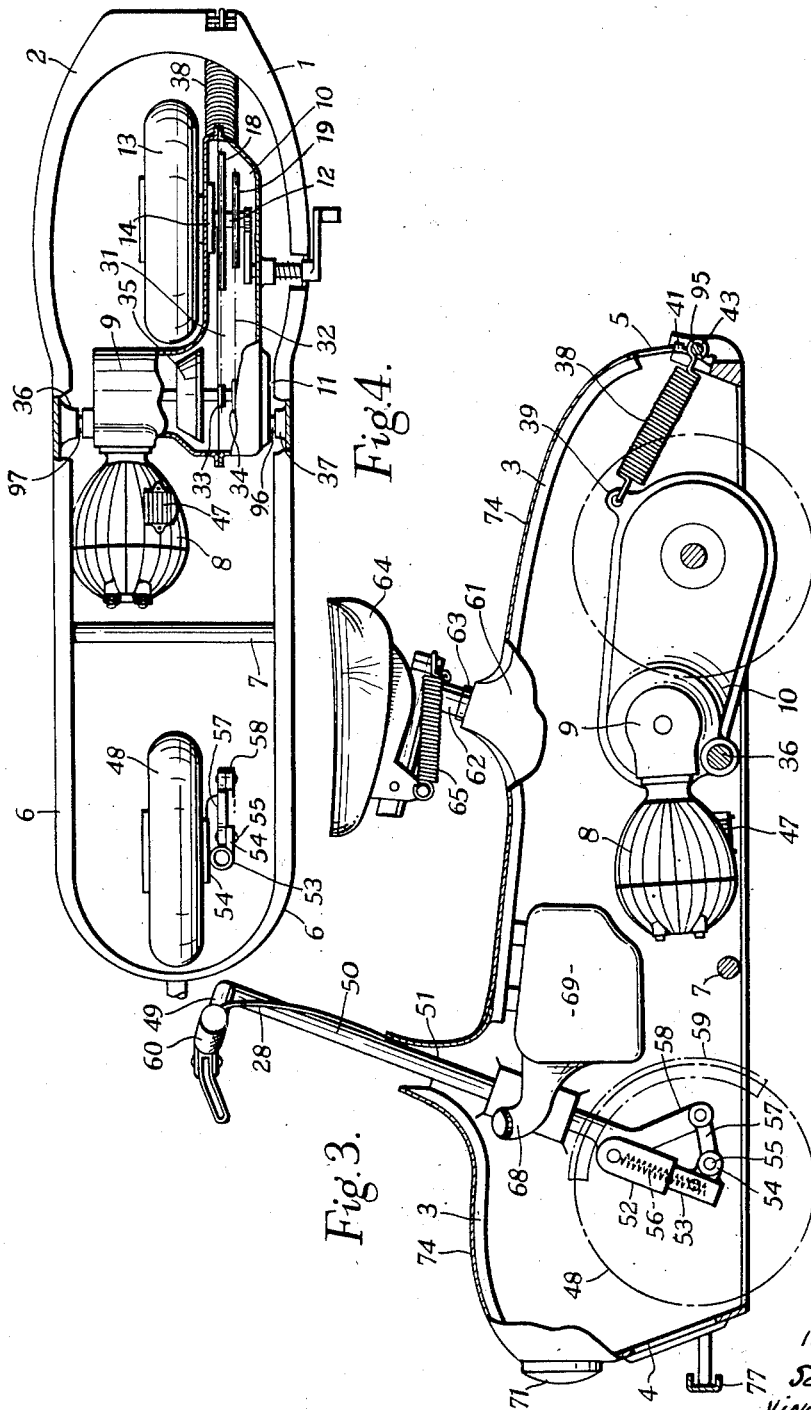

United States Patent Office 2,792,899
Patented May 21, 1957

2,792,899
MOTOR BICYCLES OR SCOOTERS
Sanzio Pio Vincenzo Piatti, Milan, Italy Application August 28, 1951, Serial No. 244,019

Claims priority, application Great Britain
September 1, 1950

4 Claims. (Cl. 180—33)

The present invention relates to motor bicycles, and more particularly to so-called motor scooters having two road wheels of relatively small diameter and driven by an internal combustion engine, and has for an object to provide a motor scooter in which the wheels, engine and other mechanical parts are substantially enclosed in a body of streamlined and pleasing appearance on which the saddle or saddles for the driver and passengers are supported, whereby the scooter may be driven without the clothing of the driver or passengers becoming dirty or soiled by coming into contact with the wheels, engine or other mechanical parts which are likely to become dirty during use.

Another object of the invention is to provide a motor scooter in which the wheels and engine are enclosed in a body of which the external surface can easily be kept clean, and which is so constructed as to allow a stream of air to pass around the tyres and engine, for cooling purposes, whilst the scooter is in motion. A further object is to provide a scooter in which the body is fitted with foot rests and a leg shield adapted to extend in front of the legs when the driver is on the machine, said shield and foot rests and also the handle bar and saddle being removable so that the scooter can be packed in a small space for convenience of transport.

Another object of the invention is to provide a scooter with only three axes about which rotation occurs, viz. the axes of the front and rear wheels and the crank-shaft, whilst providing a scooter with a multiple speed drive.

A still further object of the invention is to provide a motor scooter of which the wheels are sprung and are easily detachable for replacement in the event of a puncture.

A still further object of the invention is to provide means for adjusting the power of the springing of the back wheel of the scooter for different carrying loads.

In order that the invention may be more readily understood, reference will now be made to the accompanying drawings which show one specific embodiment thereof by way of non-limiting example and in which:

Fig. 1 shows a rear perspective view from above of the whole machine.

Fig. 1a shows a detail of the joint between two halves of the body of the machine.

Fig. 2 shows a side elevation thereof of the complete machine.

Fig. 3 shows a side elevation in section to illustrate the layout of the parts but omitting the windshield and footboards.

Fig. 4 shows a view from below but omitting the footboards, and

Fig. 5 shows a view of the rear spring-tension-adjustment means.

In the drawings and referring particularly to Figs. 1 and 2, the body is constructed of two shells 1 and 2 which are stamped from sheet metal and joined together by welding, as shown in Fig. 1a at 3, to form a substantially tunnel-shaped body with grille openings 4 and 5 in its front and rear ends respectively. The sheet metal body thus formed is strengthened by reinforcing flanges 6 around its bottom edge as shown in Fig. 4, one or more cross members 7, and any necessary internal ribs.

The engine unit, as indicated in Figs. 3 and 4, preferably comprises a two-stroke internal combustion engine 8, the crank-case 9 of which houses the crank-shaft and the clutch mechanism in well-known fashion. An elongated gear-box 10 is attached to the clutch side of the crank-case. The crank-shaft extends through the outer wall of the gear box and at its end outside the gear box carries a fly-wheel magneto 11.

The rear wheel axle shaft 12 is mounted in bearings carried by the gear box 10 and projects from the gear box on the side thereof to which the crank-case is fitted, as shown in Fig. 4. The rear wheel 13 is mounted on this overhung axle shaft 14 and may be secured by a single bolt threaded on to the end of the shaft but this fixing has not been shown in order to reduce complications in the drawings. The shaft 14 and the bore of the wheel hub are provided with splines or other equivalent means for transmitting the drive from the axle to the rear wheel.

Two large sprocket wheels 18, 19 on the rear axle shaft 12 are respectively connected by separate chains 31, 32, as shown in Fig. 4, with two smaller sprockets 33, 34 secured on a clutch member 35 rotatable around the crank-shaft and in line with the two larger sprockets 18, 19 respectively. The two larger sprockets are of different diameters and may, for example, carry 51 and 78 sprocket teeth respectively. The corresponding smaller sprocket wheels on the clutch member 35 may have 11 and 10 teeth respectively so that, depending upon which of the larger sprocket wheels 18, 19, is engaged with the rear axle shaft, either a low speed ratio of 1:7.8 or a top speed ratio of 1:4.6 may be obtained. With these gear ratios it is possible to construct the gear box of sufficiently small diameter to use a pneumatic tyre wheel of 13 inches outside diameter.

As shown more particularly in Fig. 3, the motor unit constructed as above described, is mounted within the tunnel-shaped body in a substantially horizontal position with the engine cylinder 8 extending forwardly and the gear-box 10 rearwardly. It is mounted in position for swinging movement about a single horizontal axis by two aligned bearing studs or bolts 96, 97 extending respectively from one end of the crank-case 9 and in an aligned position from the outer wall of the gear-box 10 and through fixing bushes 36, 37 in the body. These bushes are of known type and are, therefore, not illustrated, being fitted with rubber or equivalent damping material. Bushes known commercially as "Silentblocs" may be used.

Referring now more particularly to Fig. 5, which shows a perspective detail of the rear springing means, also shown schematically in Fig. 3, a helical tension spring 38 extends from a point 39 adajcent the rear end of the gear-box 10 to the rear of the body 1, 2. The suspension point 39 on the gear-box 10 may be a lug, as shown, above the axle, the spring 38 extending in a downwardly-inclined direction from this lug to the fixing at the rear of the body. This fixing at the rear of the body is made adjustable for different loads and the adjustment is effected by securing a block 40 to the rear panelling of the vehicle at the inside and having a vertical slot 41 through which a member 42 attached to the end portion 95 of the spring 38 may pass. The member 42 is provided with a transverse bar 43 which may be caused to locate in one of a plurality of transverse slots 44 provided in the block 40 which slots project through a suitable aperture in the panelling. The transverse member 43 thus bridges one of the slots 44 and in order to secure it, the bases of the slots 44 are provided with tapped screw holes 45 for the reception of screws which also pass through similarly positioned holes 46 in the transverse member 43. By varying the position of the fixing at the rear end of the spring, not only is the effective length of the spring varied but also its inclination to the horizontal, thus giving a wide range of adjustment for different loads.

The cooling fins on the cylinder and cylinder head extend in a longitudinal direction of the vehicle for most effective cooling. By means of the mounting described, the cylinder head can be easily removed without entirely removing the motor unit and for cleaning the engine ports, the cylinder is preferably provided with a removable cover 47 as shown in Fig. 3. This cover is accessible from the under side of the engine when the engine unit is mounted in position. The sparking plug at the end of the cylinder head is also easily accessible by virtue of the space between the end of the cylinder and the front wheel. Thus, with the arrangememt described, decarbonising of the engine can be effected without removing the motor unit from the body whilst, if desired, the motor unit can be quickly removed by simply undoing the fixing bushes 36, 37 about which it rocks, and the rear spring 38.

The front wheel 48 is mounted within the front part of the tunnel body for steering movement by means of handle-bars 49 carried at the top of a handle-bar pillar 50 mounted in an upwardly extending bearing 51 carried by the body. At its lower end, the handle-bar pillar 50 carries a half-fork member which is off-set from the axis of the handle-bar pillar and comprises two telescopic tubular parts 52, 53. From one side of the lower tubular portion 53 extends a ball or roller bearing stub axle support 54 upon which the front wheel is mounted by means of a single central bolt 55. The two telescopic tubular members 52, 53 are slidable within one another against the action of a spring 56 in order to provide the front wheel springing and, in order to maintain the two tubular members in alignment, a knee-action shock absorber is situated between the two telescopic parts comprising the two brackets 57, 58 as shown in Fig. 3. An expansible or bellows-like gaiter (not shown) may be fitted around the portions of the tubular members which telescope together in order to prevent ingress of dirt between the telescopic members. If desired, a mud-guard 59, shown dotted in Fig. 3 and movable with the front wheel may also be provided.

The handle-bars 49 may be adjustable for height and are provided at opposite ends with rotatable handle-bar grips, as shown at 60 in Fig. 3. One of these grips, the right hand, controls the engine throttle, and the brake lever may be fitted at the same side of the handle-bars. The grip at the other end of the handle-bars is rotatable for gear shift and the clutch lever is mounted for rotation with this grip. The clutch lever is connected by a flexible cable 28 to the gear box 10.

The body 1, 2 is provided at a suitable point with a socket 61 for receiving the saddle pillar 62. A clamping ring 63, in accordance with normal practice, may be provided at the top of this socket for adjusting the height of the saddle 64 and the saddle may be provided with means 65 for forward and rearward adjustment of the saddle pillar also in accordance with conventional practice. If desired, a multiple saddle may be fitted.

Along the central region of the body and at each side thereof are arranged a pair of footboards 66, and extending upwardly from the front end of these footboards is a leg and windshield 67 which extends upwardly in front of the handle-bar pillar 50. In front of the leg and windshield 67, the body is formed with an aperture from which the petrol filler pipe 68 leads to a tank 69 arranged at a convenient point within the body. On one side of the body just above the adjacent foot-rest, a hinged flap or cover 70 is provided which, when opened, exposes the petrol tap for controlling the fuel to the engine and to the carburettor.

A headlamp 71 may be embodied in the nose of the body 1, 2. The reflector and lamp socket of the headlamp may be fitted to the inside of the body behind an aperture in the nose of the body and the bezel and lamp glass fitted over the outside of this aperture in accordance with conventional automobile practice. A rear lamp 72 may be carried at the rear of the body. The electric leads 73 to these lamps may be located beneath a hollow beading 74 secured over the welded joint 3 between the two halves of the body as shown in detail in Fig. 1a. This beading simultaneously provides a good finish over the welded joint, as can be seen from the pictorial representations of Figs. 1 and 2. Current for the lights may be derived from the flywheel magneto 11 which may also be used for operating an electric horn. The horn and light switches may be fitted on the handlebars, as at 75 and 76. Bumper 77 may be fitted adjacent the lower edge of the front of the body in order to protect the headlamp glass which would otherwise be the most forward point of the vehicle.

The brakes may be actuated in known manner by cables from the brake lever 78 on the handlebars.

With the scooter described the tyres and engine are cooled by the stream of air flowing through the tunnel-shaped body whilst the vehicle is in motion. The internal surfaces of the vehicle are smooth and easily cleanable and cannot become dirty from the engine or from mud splashed up by the vehicle wheels.

While a particular emodiment has been described, it is to be understood that various modifications may be made without departing from the scope of the invention and that protection is sought for the various novel features herein described, both separately and in any combination.

I claim:

1. A motor scooter comprising a tunnel-shaped body open at its underside and formed from two longitudinally-juxtaposed half-shells having upwardly-extending flanges joined together, a hollow beading secured over said joint so as to accommodate electric wiring for the vehicle, a reinforcing flange secured to the lower edge of the body, two road wheels mounted within said body at either end thereof, an engine and gear box narrower than said body also mounted within said body, a seat and handlebars extending above said body and apertured members in the front and rear ends of the body to permit a stream of air to pass in through the front apertured member around said wheels, engine and gear box unit and out through the rear apertured member.

2. A motor scooter comprising a sheet metal tunnel-shaped body open at its underside and formed from two longitudinally-juxtaposed half-shells having upwardly extending flanges joined together, a hollow beading secured over said joint so as to accommodate electric wiring for the vehicle, a reinforcing flange secured to the lower edge of said body, two road wheels mounted within said body at either end thereof, an engine and gear box narrower than said body also mounted within said body, said body being of substantially the same width from front to rear, a seat and handlebars extending above said body and apertured members in the front and rear ends of the body to permit a stream of air to pass in through the front apertured member around said wheels, engine and gear box and out through the rear apertured member.

3. A motor scooter comprising a sheet metal tunnel-shaped body open at its underside and formed from two longitudinally-juxtaposed half-shells having upwardly extending flanges joined together, a hollow beading secured over said joint so as to accommodate electric wiring for the vehicle, a reinforcing flange secured to the lower edge of said body, two road wheels mounted within said body at either end thereof, an engine and gear box narrower than said body also mounted within said body, said body being of substantially the same width from front to rear but being outwardly bulged at the portion of the body adjacent the rear wheel, a seat and handlebars extending above said body and apertured members in the front and rear ends of the body to permit a stream of air to pass in through the front apertured member around said wheels, engine and gear box and out through the rear apertured member.

4. A motor scooter comprising a sheet metal tunnel-shaped body of inverted U-form throughout its length and having front and rear end walls each provided with openings to allow air to pass therethrough, the underside of said tunnel-shaped body being open from end-to-end of the body, a steerable road wheel fitted with a tyre mounted within the front end of said body and connected to a handlebar column projecting upwardly through the body and provided with handlebars at its upper end, a second driving road wheel fitted with a tyre mounted within the rear end of said body, an engine mounted within said body between said two road wheels and connected to drive said second driving road wheel, and a seat carried above said body and rearwardly of said handlebars, the internal surface of the tunnel-shaped body being substantially smoothly curved from end to end and of substantially the same width to allow the air which enters the body through the openings in the front wall to flow in a streamline manner through the body past the front steerable wheel, the engine, and the rear driving wheel and out through the openings in the rear wall, thereby efficiently to cool the wheel tyres and engine mounted within the body.

References Cited in the file of this patent

UNITED STATES PATENTS

| | | |
|---|---|---|
| 690,158 | Lane et al. | Dec. 31, 1901 |
| 1,183,938 | White | May 23, 1916 |
| 1,200,254 | Stanley | Oct. 3, 1916 |
| 1,297,676 | Gibson | Mar. 18, 1919 |
| 1,479,738 | Pullin | Jan. 1, 1924 |
| 1,629,493 | Ford | May 24, 1927 |
| 1,682,532 | Maise | Aug. 28, 1928 |
| 1,858,743 | Langstreth | May 17, 1932 |
| 1,951,637 | Thonger et al. | Mar. 20, 1934 |
| 1,953,515 | Smith | Apr. 3, 1934 |
| 2,035,462 | Courtney | Mar. 31, 1936 |
| 2,117,116 | Page | May 10, 1938 |
| 2,193,289 | MacBlane | Mar. 12, 1940 |
| 2,225,914 | Lewis et al. | Dec. 24, 1940 |
| 2,589,793 | Franks | Mar. 18, 1952 |

FOREIGN PATENTS

| | | |
|---|---|---|
| 364,276 | Germany | Nov. 20, 1922 |
| 372,914 | Germany | July 9, 1920 |
| 193,052 | Great Britain | Nov. 15, 1923 |
| 375,157 | Italy | Sept. 25, 1939 |
| 90,204 | Switzerland | Oct. 1, 1921 |
| 270,733 | Switzerland | Dec. 16, 1950 |